W. T. Mills.
Clover Harvester
No. 22817 — Patented, Feb. 1, 1859.
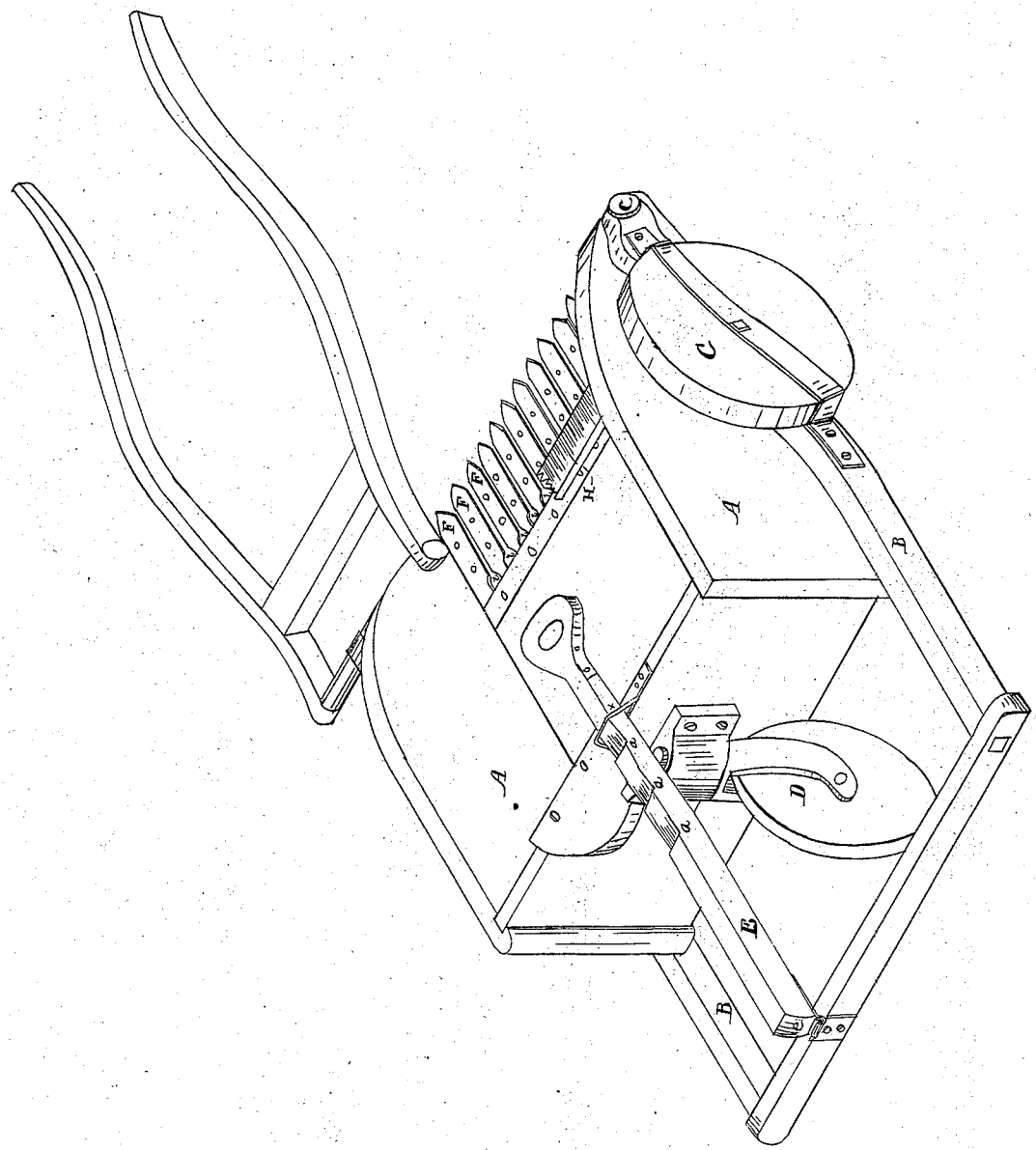

UNITED STATES PATENT OFFICE.

WM. T. MILLS, OF GALESBURG, MICHIGAN.

IMPROVEMENT IN CLOVER-PICKERS.

Specification forming part of Letters Patent No. 22,817, dated February 1, 1859.

*To all whom it may concern:*

Be it known that I, WM. T. MILLS, of Galesburg, in the county of Kalamazoo and State of Michigan, have invented certain new and useful Improvements in Clover-Pickers; and I do hereby declare that the following is a full, clear, and exact description of the same, reference being had to the accompanying drawing, and to the letters of reference marked thereon.

The nature of my invention consists in constructing a clover-picker in such a manner that the heads of clover may be removed without the employment of a knife-scraper, as will be hereinafter described.

In the annexed drawing, which is a perspective view of my machine, A represents the box or bed into which the clover-heads are received. This box is elevated a short distance from the ground, and rests upon three wheels. Wheel D is secured at the back of the box in such a manner as that it will swivel around and accommodate itself to the motion of the team drawing the machine.

B B is a frame, in which the box A is secured, being attached to said frame at c. Two wheels, C, are secured in this frame near its front, said wheels serving to carry the front of the machine.

E is a lever, which is hinged to the back of frame B, and which rests upon the back of the box A, between the box and a staple, x. This lever is provided with notches a a a, which catch upon the staple and secure the lever in any desired position. This lever is for the purpose of lowering or elevating the back of the frame, thus regulating the front of the machine to suit the height of the clover. The front part of the bed or box A is provided with a number of teeth, F F F, slots d separating them. At the back of these teeth the slots d d d either widen gradually or open suddenly into holes marked i i i. The back of the slots and the holes i i i are covered over by a plate, H, which extends across the machine. This plate is sharp on its front edge, but rises as it extends back, and then turns down abruptly to the bottom of the box A, as is shown.

In operating this machine the clover-heads will be caught when it is in motion between the teeth in the slots d d d. They pass back to the plate H, where they are pulled or cut off by said plate. The stubble or stalk of the clover passing under the plate is freed from the slot very readily, as the slots widen or terminate in holes i i i. The slots would be apt to choke up unless they were wider at their back; but if they were made wider without using the plate H they would still choke or else lose a great many heads by their passing through them, or a great deal of seed would be lost; but with this arrangement the heads are caught and cut off, and the stubble passes out without clogging the machine.

I do not claim any of the members of this machine individually, as they are not new; but,

Having thus fully described my invention, what I claim as new, and desire to secure by Letters Patent, is—

Providing the teeth F F with the holes i i i and angular plate H, when arranged at the front edge of the adjustable platform or box A, and in relation to each other, in the manner described, and for the purpose specified.

WILLIAM T. MILLS.

Witnesses:
　GEORGE W. STEVENSON,
　A. S. MASON.